US005706434A

United States Patent [19]
Kremen et al.

[11] Patent Number: 5,706,434
[45] Date of Patent: Jan. 6, 1998

[54] INTEGRATED REQUEST-RESPONSE SYSTEM AND METHOD GENERATING RESPONSES TO REQUEST OBJECTS FORMATTED ACCORDING TO VARIOUS COMMUNICATION PROTOCOLS

[75] Inventors: Gary Kremen; Kevin Scott Kunzelman, both of San Francisco; Peng Tsin Ong, Redwood City; Scott M. Fraize, San Francisco; Piyush Bansidhar Shah, Mill Valley, all of Calif.

[73] Assignee: Electric Classifieds, Inc., San Francisco, Calif.

[21] Appl. No.: 498,943

[22] Filed: Jul. 6, 1995

[51] Int. Cl.⁶ .................................. G06F 15/163
[52] U.S. Cl. .................... 395/200.09; 395/200.14; 395/200.18; 395/500; 395/285; 395/610
[58] Field of Search .................. 395/200.18, 500, 395/831, 285, 200.09, 200.14, 610

[56] References Cited

U.S. PATENT DOCUMENTS

| | | | |
|---|---|---|---|
| 3,614,328 | 10/1971 | McNaughton et al. | 370/62 |
| 4,751,669 | 6/1988 | Sturgis et al. | 345/115 |
| 4,805,119 | 2/1989 | Maeda et al. | 364/518 |
| 4,969,093 | 11/1990 | Barker et al. | 395/800 |
| 5,165,030 | 11/1992 | Barker | 395/500 |
| 5,193,110 | 3/1993 | Jones et al. | 379/94 |
| 5,319,455 | 6/1994 | Hoarty et al. | 348/7 |
| 5,329,619 | 7/1994 | Pagé et al. | 395/200.01 |
| 5,347,632 | 9/1994 | Filepp et al. | 395/200.09 |
| 5,377,191 | 12/1994 | Farrell et al. | 370/401 |
| 5,406,557 | 4/1995 | Baudoin | 370/407 |
| 5,420,916 | 5/1995 | Sekiguchi | 379/230 |
| 5,535,375 | 7/1996 | Eshel et al. | 395/500 |
| 5,546,584 | 8/1996 | Lundin et al. | 395/683 |

*Primary Examiner*—Kenneth S. Kim
*Attorney, Agent, or Firm*—Merchant, Gould, Smith, Edell, Welter & Schmidt, P.A.

[57] ABSTRACT

A method and apparatus is provided to accomplish creation and serving of data objects among various communication protocols. The method and apparatus can be used in such applications as an on-line classified advertising system on the Internet involving the World Wide Web and electronic mail. In the apparatus, a request decoder receives an incoming request, decodes the request using configurations from a configuration database in order to identify which protocol was used to transmit the request, and generates from the request a corresponding abstract data object. A data processor merges data from a main database with the abstract data object. An object formatter formats the abstract data object including the merged data. An object deliverer formats the object for outgoing transmission according to a protocol of an intended recipient. The functions of object deliverer may be performed by the object formatter.

31 Claims, 11 Drawing Sheets

From: anne@whatsamatta-u.edu
To:   server@foobar.com

Please send me my favorite table of figures

Incoming Request for Object

FIG. 2A

```
Hello, [merge USER_NAME].  <P>
[if [capability TABLES]
      {<CENTER>Here is the table you
      requested:<P>
      [include THE_TABLE]</CENTER>}
      {I am sorry, but your client
      doesn't support tables.}]  <P>
[include THE_FOOTER]
```

Abstract DFL-Embedded DPL Object

FIG. 2B

```
Hello, Anne. <P>
<CENTER>Here is the table you
        requested:<P>
<TR><TH></TH><TH>X</TH><TH>Y</TH></TR>
<TR><TH>A</TH><TD>X</TD><TD>Y</TD></TR>
<TR><TH>B</TH><TD>X</TD><TD>Y</TD></TR>
</TABLE></CENTER>  <P>
<B>Copyright 1995 Foobar Corp. </B>
```

Unformatted DFL Object (Processed)

FIG. 2C

Hello, Anne.

Here is the table you requested:

```
      |  X  |  Y  |
------+-----+-----+
  A   |  1  |  2  |
------+-----+-----+
  B   |  3  |  4  |
------+-----+-----+
```

COPYRIGHT 1995 FOOBAR CORP.

Concrete Object (Client-Specific)

FIG. 2D

```
From: server@foobar.com
To:   anne@whatsamatta-u.edu

Hello, Anne.

Here is the table you requested:

|  X  |  Y  |
         ---+-----+-----+
          A |  1  |  2  |
         ---+-----+-----+
          B |  3  |  4  |
         ---+-----+-----+

COPYRIGHT 1995 FOOBAR CORP.
```

Outgoing Object

FIG. 2E

| Property | Predicator | Argument 1 | Argument 2 | ... | Argument n |
|---|---|---|---|---|---|
| NETSCAPE-1.1 | matches | WWW Client | Netscape1.1 | | |
| FROM-AOL | matches | Fromline | AOL.com | | |
| FROM-PRODIGY | matches | Fromline | Prodigy.com | | |
| MOSAIC-2.5 | matches | WWW Client | Mosaic2.5 | | |
| MOSAIC-2.6 | matches | WWW Client | Mosaic2.6 | | |

FIG. 3A 5,706,434

INTEGRATED REQUEST-RESPONSE SYSTEM AND METHOD GENERATING RESPONSES TO REQUEST OBJECTS FORMATTED ACCORDING TO VARIOUS COMMUNICATION PROTOCOLS

FIELD OF THE INVENTION

The present invention generally relates to a method and apparatus to accomplish creation and serving of data objects, and more particularly a method and apparatus to accomplish creation and serving of data objects in which users and client applications (the recipients of the data objects) have a diverse set of properties and capabilities such as the use of different protocols and data languages in clients and different characteristics of users such as, for example, gender, age, interests, and preferences.

BACKGROUND OF THE INVENTION

Open Systems Interconnection (OSI) Communications Model

As will be appreciated by those skilled in the art, communication networks and their operations can be described according to the Open Systems Interconnection (OSI) model. This model includes seven layers: an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multilayer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.g., layer 4 at the destination "confirms the request for a connection," so to speak, that it has received from layer 4 at the source).

Layer 3, the network layer, provides routing and relaying of data through the network (among other things, at layer 3 on the outbound side an "address" gets slapped on the "envelope" which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data moves across those physical connections from layer 1 at the source to layer 1 at the destination.

The particular focus of the following discussion is on media access control (MAC) for communication networks which is performed in the OSI network and data link layers. It will be appreciated by those skilled in the art that various applications and components operating in the other OSI layers may be interchangeably used with the particular MAC described below so long as these applications and components adhere to the OSI design structures. For example, many different OSI physical layer components (e.g., a parallel bus, a serial bus, or a time-slotted channel) can be used in conjunction with the same MAC so long as each of the OSI physical layer components passes the particular information required by OSI design parameters to the OSI data link layer.

Standard Data Communication Network Protocols

Standard data communication network protocols, such as that which is described above, offer new abilities and corresponding technological problems. Standard network protocols suites such as the Transmission Control Protocol/Internet Protocol suite (TCP/IP) allow for the easy creation of transport-layer protocols. These transport protocols and accompanying data languages allow for a diverse set of client applications which communicate using them. This ability to support a diverse client base is a boon to the commercial and mainstream potential of data communications networks because diversity is a necessary condition for a product in the marketplace. Diversity, in some cases being helpful, can also be a problem. The main problem with the diverse client base is that not every client knows every version of every protocol or every dialect of every data language. Thus, coordination between a server and these clients can be a difficult problem. Electronic mail (email) on the Internet, for example, uses Simple Mail Transport Protocol (SMTP) and adheres to the Request for Comments 822 (RFC822) message standard.

Common email clients for the Internet are Udora, Elm, PINE, PRODIGY Mail, and AMERICA ONLINE Mail. The protocols and languages used are all generally the same email clients. However, each client has different properties and capabilities which make the general process of creating and serving objects via email difficult. For example, email clients differ in how wide each line of a message may be (e-mail messages used by the PRODIGY e-mail client are 60 characters wide, whereas those used by the AMERICA ONLINE e-mail client are 49). They also differ in terms of what extensions they support—some email clients support the Multipurpose Internet Mail Extensions (MIME), but most do not. Similarly, the World Wide Web (WWW), an internet-distributed hypermedia (text, image, sound, video) network, primarily uses Hypertext Transfer Protocol (HTTP) and Hypertext Markup Language (HTML) for its communication.

The WWW has the same problem as email with regard to clients. There exist different versions of HTTP and different dialects of HTML, and most clients do not know all of them. For example, Netscape Communications Corporation has put forth its own extensions to HTML for features such as background images behind text and centered text. These features are not official industry standards but are becoming just as good in the sense that they are de facto standards. Another problem of the easy creation of new transport-layer protocols is that new transport-layer protocols and data languages (either standard or custom) continue materializing. These protocols and languages either solve new communications problems (such as HTTP and HTML enhancing the Internet with hypermedia), or better solve older ones (e.g., Sun Microsystems' new HOT JAVA extensions to HTML and the JAVA programming language promise to be the next best feature for the WWW).

The Importance of an Integrated System

With the diversity of data communication protocols and languages, there is a tendency for engineers to try to build a system for each of the many protocols and languages, rather than to build a single system to address all of them. This is because in a certain sense it is easier to write an individual system with a more limited domain than an integrated system with a more expanded domain; one does not have to expend the effort necessary to abstract out the common features across a diverse set. However, it is very expensive to maintain many individual systems and usually much cheaper to maintain a single integrated system. Also, it is much more difficult to maintain feature parity and share data between many individual systems as opposed to within an integrated system. An additional benefit of an integrated system would be that, because the step has already been taken to abstract out common features of various protocols and languages, it is much easier to adapt to newer ones, which will most likely be abstractly similar enough to the older ones to allow for easy integration.

Two-Way Communication and the Drive Towards Peer-To-Peer Mass Communications

New communication models emerging from usage of data communications networks such as the Internet are causing changes in the relationship between data producers and data consumers. It used to be that with the one-to-many, one-way model of television and radio, content was produced by a small elite of entertainer-business persons and was consumed by the masses. The two-way nature of data communications networks, however, allows for the more intimate participation of the consumer. Even to the point of blurring the distinction between consumer and producer: because of the ability to participate, the old consumer can now be both a consumer and a producer on networks such as the Internet. Relationships on data communications networks are much flatter and more egalitarian in the sense that each participant is a peer (both a producer and consumer). One important outgrowth of this elevated status of the individual on a data communications network is that the individual now demands more personalized attention. For example, if a peer provides another with knowledge about him or herself (e.g., geographic location, gender, age, interests), then he or she expects that responses should take this knowledge into account. A peer can no longer be treated like a demographic average as in the world of television and radio.

The Technological Problems in Need of Solution

Given these new data communications networks and their technological and social implications, it is evident that new systems should provide solutions, for example, to the following problem: How does one design an integrated system that uses multiple protocols and data languages and serves data in a way that takes advantage of knowledge about clients and users?

DESCRIPTION OF RELATED ART

The ability to create and serve objects has been around ever since the birth of the client/server model. Also, the notion of providing services to general users through data communications networks has been around at least since the early days of VideoTex. However, this technology was limited and was more focused on building specialized VideoTex terminals that fit some particular mold required by particular servers (see, for example, U.S. Pat. No. 4,805,119) rather than being focused on making servers be flexible in handling a variety of client types. This is probably due to the fact that work on VideoTex was done by individuals with the television frame of mind—content would be created in a central way and then broadcast to the masses. The cultural importance of peer-to-peer communications was not fully recognized at that time.

Integrated services platforms have been developed for telephone networks (see, for example, U.S. Pat. No. 5,193,110) but still only focus on telephone calls (essentially a single protocol as opposed to many). In recent years, a number of online service providers—the Prodigy Service Company, America Online, CompuServe, and others—have developed their own means to create and serve objects in a similar vein. Technologically, these companies are not all that different from the older VideoTex companies. They require users to obtain custom software clients which speak custom protocols in order to interact with their servers, even if their software can be used on different personal computers to make their services personal computer-independent (see, for example, U.S. Pat. No. 5,347,632). Because of these custom clients and protocols, these services are mutually incompatible.

What is not addressed by services like these is the growing usage of standard communication protocols and languages (like SMTP, HTTP, and HTML) in providing services to standard clients. Ultimately, this usage of proprietary clients and protocols leads to self-destruction in a marketplace which demands standardization, decentralized control, and diversity. With regard to the personalization of service, attention has lately been paid to the need to support customized content to clients, such as customized television commercials (see, for example, U.S. Pat. No. 5,319,455). But one can see limitations in the philosophy of this work in that clients are still seen as "viewers" in a one-way communications model, rather than as participants in a two-way model. Also, technologies have been developed to abstract data and present it in dynamic ways based upon user parameters (see, for example, U.S. Pat. Nos. 5,165,030 and 4,969,093). However, this effort has not been focused on protocol-independence and language-independence of this abstracted data.

SUMMARY OF THE INVENTION

This invention is directed to an apparatus and method for generating abstract data objects from requests received from any one of a plurality of communication protocols. In the apparatus and method, a request is received from any one of a plurality of communication protocols. Additional functionality of the apparatus and method determines which of the communication protocols was used to transmit the request, and generates from the request, using results of the determining, a corresponding abstract data object, the abstract data object being independent of the plurality of communication protocols.

A further apparatus and method in accordance with the invention includes, in addition to the elements described above, functionality for generating from the abstract data object a data object which is formatted for transmission according to a communication protocol of an intended recipient of the data object.

A further apparatus in accordance with the invention includes a main database, configuration database, and modules coupled to the databases. The main database stores data to be merged with objects. The configuration database stores configurations for use in decoding requests and formatting objects. A request decoder, coupled to the configuration database, receives an incoming request, decodes the request using the configurations in order to identify which protocol was used to transmit the request, and generates from the request a corresponding abstract data object. A data processor, coupled to the main database, the configuration database, and the request decoder, receives the abstract data object from the request decoder and merges data from the main database with the abstract data object. An object formatter, coupled to the configuration database and the data processor, receives the merged abstract data object from the data processor and formats the abstract data object including the merged data. An object deliverer, coupled to the configuration database and the object deliverer, receives the data object from the object formatter and formats the data object for outgoing transmission according to a protocol of an intended recipient of the data object.

BRIEF DESCRIPTION OF THE DRAWINGS

FIG. 2A is an example of an incoming request for object.

FIG. 2B is an example of an abstract DFL-embedded DPL object. DFL and DPL stand for "data formatting language" and "data processing language" respectively.

FIG. 2C is an example of an unformatted DFL object (processed).

FIG. 2D is an example of a concrete object (client-specific).

FIG. 2E is an example of an outgoing object.

FIG. 3A is an example of property rules in a configuration database for use in processing objects.

DETAILED DESCRIPTION

Overview

Figure 1:
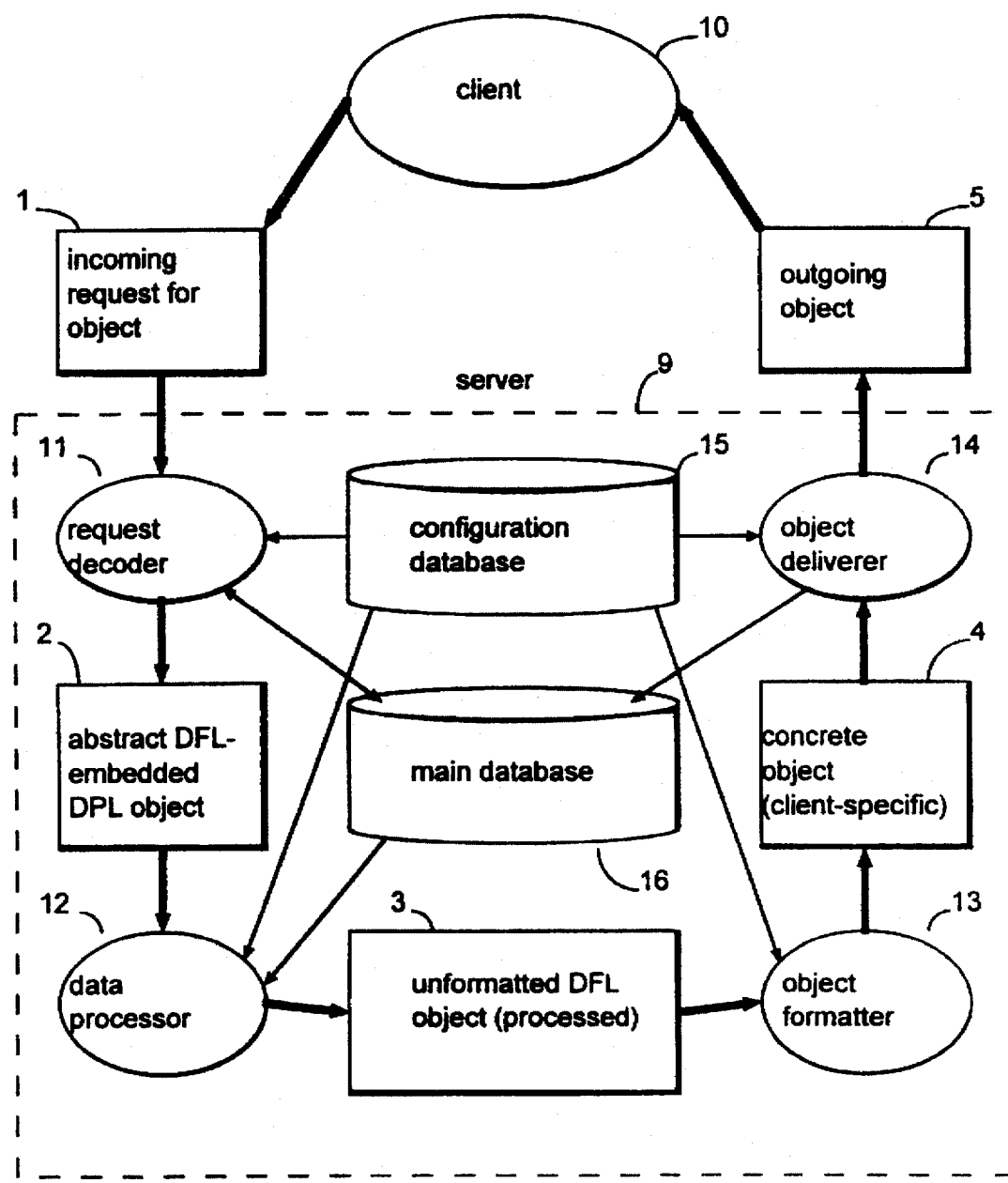
FIG. 1 is a diagram of a preferred architecture and flow chart for implementing the present invention.

The present invention solves at least the aforementioned problems. In short, the present invention provides a method and defines an apparatus for creating and serving custom objects "on-the-fly" (dynamically) for requests coming from users and clients through various protocols and in various languages. An example of an implementation of the present invention is referred to as dynamic object creation and serving (DOCS). As shown in FIG. 1, a DOCS method has four preferred main phases, each of which is performed by a particular module in an apparatus implementing DOCS: request decoding and object creation 11, data processing 12, object formatting 13, and object delivery 14. In addition to modules for these four phases in a DOCS implementation, there are typically two database modules: a main database module 16 and a configuration database module 15. The main database module 16 provides a read-write memory for storing and serving non-configuration data. The configuration database module 15 stores configurations for the other modules.

DOCS also uses two different internal languages: a data processing language (DPL) and a data formatting language (DFL). A DFL is a means for specifying concrete, client-independent objects. A DPL is a means for specifying abstract objects. Usually, abstract objects are defined by embedding DFL code and code fragments within the DPL. The data processor 12 then takes abstract objects defined in a DFL-embedded DPL and outputs plain DFL objects for an object formatter.

An object is defined herein as a collection of data. An object may be an image, audio, video, text, or a document containing a combination of the above because an object may contain sub-objects. A request is an object itself, but maintains the name "request" to distinguish itself from other objects in DOCS or other implementations. The term "request" also serves as a name for the category of incoming objects that would result in some sort of processing being performed by a DOCS system, although a "request" does not necessarily have to be a request in a human sense. For example, through a "request" a client may inform a DOCS system of a particular piece of information (e.g., user X is 5 foot, 11 inches tall). Explicitly this is not a request, but implicitly the "request" is asking that a DOCS system store the information for reference in future "requests" and provide the client with some sort of acknowledgment.

Phase One: Request Decoding and Object Creation

A request comes in to a DOCS server 9 from a client 10 through one of a plurality of communication protocols (e.g., Simple Mail Transfer Protocol (SMTP), Hypertext Transfer Protocol (HTTP), Request For Comments 822 (RFC822), or Hypertext Markup Language (HTML)). A protocol is any means for communication; for example, a process for sending a message which could include data format. As used herein, "protocols" include languages for communication.

Even though some clients are similar in that they speak the same protocol they may differ in dialect. For example, on the World Wide Web, all clients typically use the HTTP protocol and HTML (Hypertext Markup Language), though different clients use different versions of HTTP and speak different dialects of HTML. To solve the problem of coordinating communication across multiple protocols and dialects, the request decoder has sub-modules which know each desired protocol and can recognize properties of various clients (such as preferred data language dialects). As used herein, "properties" includes properties and capabilities. A capability is a type of property which specifies, for example, how a client can format data or perform other functions.

Rule sets are used to decode properties of clients. As in a conventional expert system, these rule sets may be encoded logical rules and heuristics that tell how to recognize properties from protocols and request clues and how to deal with particular clients (see FIGS. 3A and 3B). After identifying what object was requested, the request decoder 11 also informs the main database 16 of any information updates from the incoming request. To finish the phase, the request decoder creates and passes an abstract DFL-embedded DPL skeleton object to the data processor 12.

Phase Two: Data Processing

The data processor 12 receives the abstract DFL-embedded DPL message template from the request decoder 11 and retrieves any needed information from the main database 16 (such as a classified advertisement or the results of a database search) to merge with the abstract object skeleton. When executed, the DPL object performs merging substitutions and other manipulations on the abstract skeleton object. Properties of users and clients as well as data retrieved from the main database 16 and configuration database 15 can all affect how the DPL object is assembled. The result of all of this manipulation is an object defined in DFL, which is then passed on to the object formatter 13.

Phase Three: Object Formatting

The object formatter 13 receives a merged, but unformatted, DFL object from the data processor. The object formatter 13 then converts the client-independent DFL data object description into a concrete, client-dependent object ready for outgoing transport. This conversion is accomplished by using a set of filters (dependent upon properties of the client) that take a DFL object and convert it to a particular concrete format such as RFC822 or HTML using a set of configured formatting rules (see FIG. 6). The concrete formats themselves may be forms of a DFL (e.g., HTML is a DFL). Therefore, the main DFL should be abstract and powerful enough to express structures in any of the possible DFLs of the concrete formats. Also, because the DFL object is originally embedded as code and code fragments within a DPL object, some of the object formatting can actually be done by the data processor. This is because the outputted DFL object can vary depending upon inputs to the DPL object. The object formatting phase is not meant to be the only formatting phase, just preferably the final formatting phase before object delivery.

Phase Four: Object Delivery

While the request decoder 13 is much like a receiver for a server using a DOCS methodology, the object deliverer 14 is much like a transmitter. Like the request decoder 11, the object deliverer 14 has submodules that understand different communication protocols, but instead of being designed to decode incoming objects, it is designed to format outgoing objects for transmission. Object formatting and object delivery could alternatively be performed in one stage or a single process.

Main Database

The main database 16 is typically used to store information from incoming requests, record outgoing transactions, and serve data to be placed in outgoing objects.

Configuration Database

The configuration database 15 is typically used to store configurations for decoding requests and formatting objects. The configuration database 15, though logically separate from the main database 16, could actually be physically stored in the same place as the main database 16 (e.g., in relational database tables), although this is not necessary.

Data Processing Language (DPL)

A DPL is a language whose function is to organize, substitute, and otherwise manipulate data. A DPL may or may not be a specialized language, though it may be driven to be a specialized language by particular needs for data manipulation. Usually, a DPL should be robust in function and offer basic conditional and control structures (such as IFs, loops, and procedure calls) so that these abilities are available in the creation of objects.

Data Formatting Language (DFL)

A DFL is a language whose primary function is to organize the presentation of data. A DFL could be implemented with a markup language (such as SGML or HTML), or a sophisticated programming language (such as the POSTSCRIPT language). There is no requirement that the DPL and DFL be separate languages. It is possible that they could be the same language (e.g., the POSTSCRIPT language could be both a DPL and a DFL because it offers both data manipulation abilities and data formatting abilities).

DESCRIPTION OF A PREFERRED EMBODIMENT

In a preferred embodiment of the invention disclosed herein, a system operates using a programmed computer having the UNIX operating system. The exemplary embodiment uses a SPARCCENTER 2000 server. Other computer hardware and operating systems capable of running on a network may be used with some modifications to software (e.g., an IBM-Compatible 80486 personal computer having the MICROSOFT WINDOWS NT operating system, or a Digital Equipment Corporation VAX 11/780 having the VMS operating system). Although a preferred embodiment uses both the Perl and C programming languages, other programming languages may be used to implement the present invention. A preferred embodiment of the invention also has program modules for the various phases of a DOCS method.

The modules shown in FIG. 1 are an example of an implementation of the phases of a DOCS method. FIGS.

2A–2E illustrate an example of processing a request throughout the modules shown in FIG. 1.

Request Decoding

The request decoder 11 and object deliverer 14 share various protocol modules for communication. There are, for example, two protocol modules: one for SMTP electronic mail communication and one for HTTP-based World Wide Web communication. These two protocol modules were chosen for the exemplary embodiment because these protocols are both widespread and popular. Other protocol modules such as for Sun Microsystems' HOT JAVA language can be built using the principles of the present invention.

The request decoder 11 (see FIG. 1), upon receiving a request from one of the protocol modules, first discovers properties of the client and the request with the help of the protocol module using sets of rules. The Request Decoder 11 then routes the request internally to one of several components that handle different kinds of requests (e.g., requests to change database information, requests to perform database searches). Final decoding of the request and creation of the abstract DFL-embedded DPL object is handled by the component. FIG. 2A provides an example of an incoming request for object 1 received by the request decoder 11.

Figure 3B:
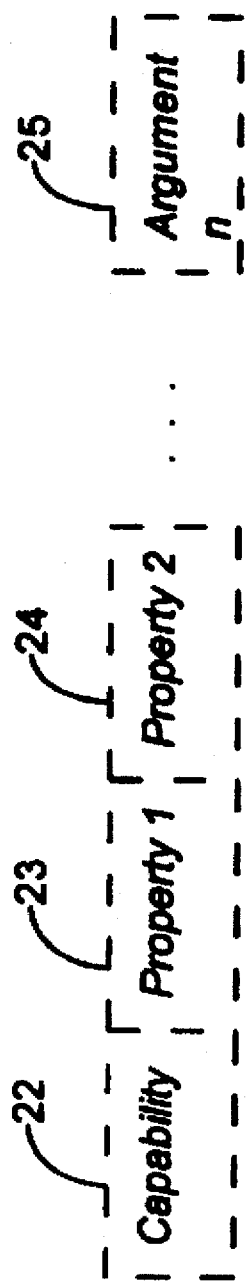
FIG. 3B is an example of capability rules in a configuration database for use in processing objects.

FIGS. 3A and 3B illustrate an example of property rules and capability rules stored in the configuration database 15. The request decoder 11 uses these rules in order to identify a protocol which was used to transmit a request and also to determine other various properties of a request for use in later formatting and data merging. As shown in FIG. 3A, properties 17 are correlated using predicators 18 with arguments 19, 20, and 21. By applying the arguments 19 and 20 to the request, the system can determine the corresponding property 17 such as the protocol which was used to transmit the request. For example, if the "fromline" of the request contains "AOL.com," then the system determines that the request was sent from the AMERICA ONLINE service. As shown in FIG. 3B, the system uses additional rules to determine other properties such as various capabilities of a request. This is accomplished by correlating capabilities 22 with properties 23, 24, and 25. For example, if the request was transmitted using the Netscape 1.1 browser, it can accommodate tables.

Figure 4:
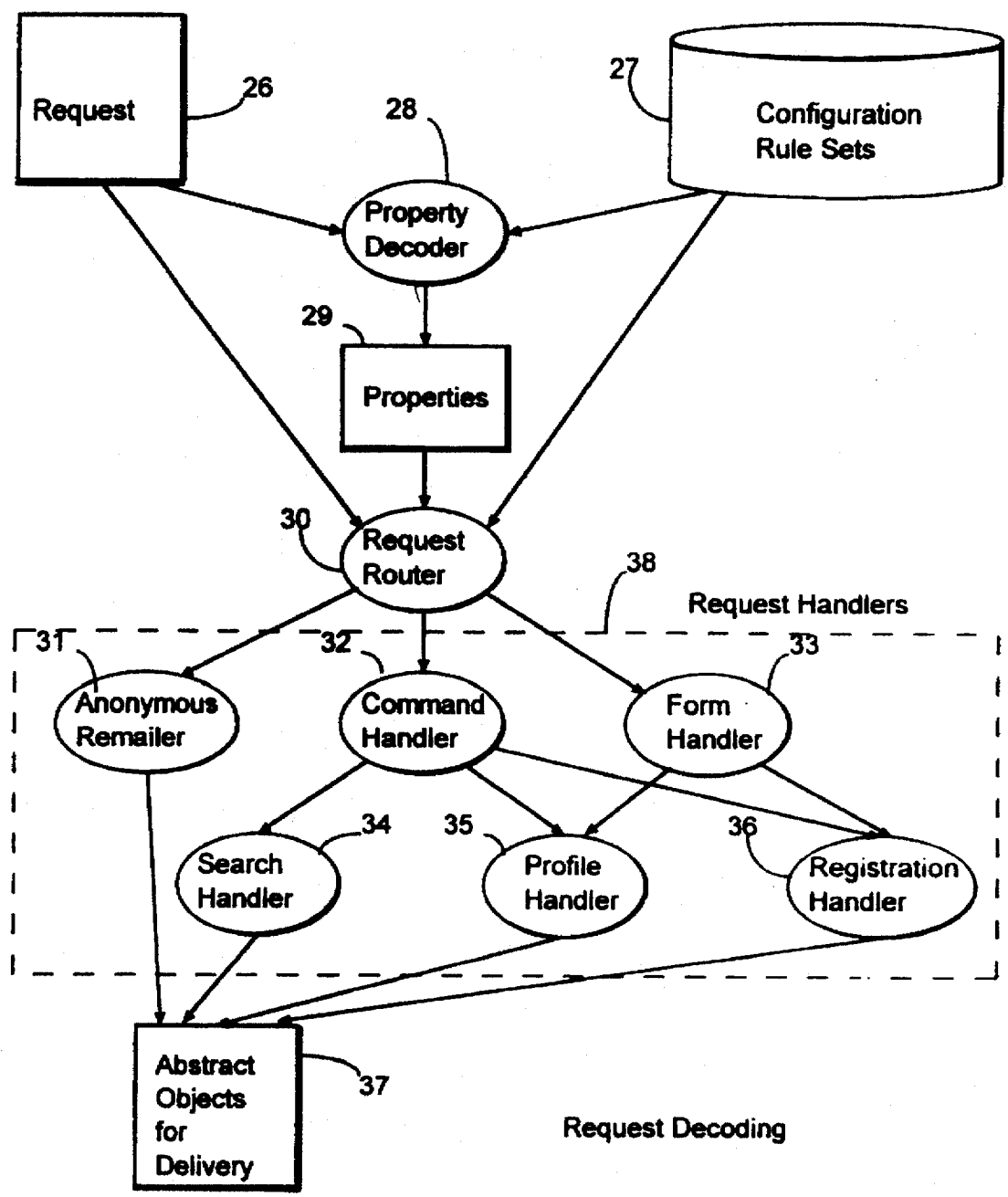
FIG. 4 is a flow chart of a preferred request decoding process.

FIG. 4 is a more detailed flow chart of the request decoder 11. The request 26 is sent to both a property decoder 28 and an internal request router 30. The property decoder 28 uses rules 27 from the configuration database 15 in order to determine properties of the request as described above. These properties 29, such as a protocol of the data object requester, are also sent to the request router 30 and are used for processing the requests.

The request router 30 performs optional additional processing using request handlers 38 depending upon an implementation and use of the present invention. For example, in an on-line classified advertising system, the request handlers may include: a anonymous remailer 31 for transmitting anonymous email; a command handler 32 for processing commands in the request; a form handler 33 for processing forms in the request; a search handler 34 for processing search requests; a profile handler 35 for processing a user's profile; and a registration handler 36 for processing a user's on-line registration. The processing by the request handlers 38 results in an abstract object for delivery 37.

FIG. 2B provides an example of an abstract DFL-embedded DPL object 2 resulting from the decoding and processing of the request 1 in FIG. 2A by the request decoder 11. As shown in FIG. 2B, the output of the request decoder 11 results in various data merging and formatting codes in the object. For example, the code "[merge USER_NAME]" in the object in FIG. 2B is a code for retrieving a user's name from the main database 16 and merging it into the location of the corresponding code in object 2. As another example, the code "[include THE_FOOTER]" in the object in FIG. 2B is a code for retrieving such a footer from the configuration database 15 and merging it into the location of the corresponding code in object 2. An advantage of these codes is that, for example, the footer need only be stored in one location, the configuration database 15. Therefore, if the footer is changed, the new information is merged into the objects without having to change a footer in each individual object. The footer code typically remains the same, and only the footer information changes in the configuration database 15.

The various handlers 31–36 (see FIG. 4) are simply one example of an application of the present invention. The request handlers 38 are application specific and, accordingly, the required handlers depend upon such applications used in conjunction with the present invention.

Figure 5:
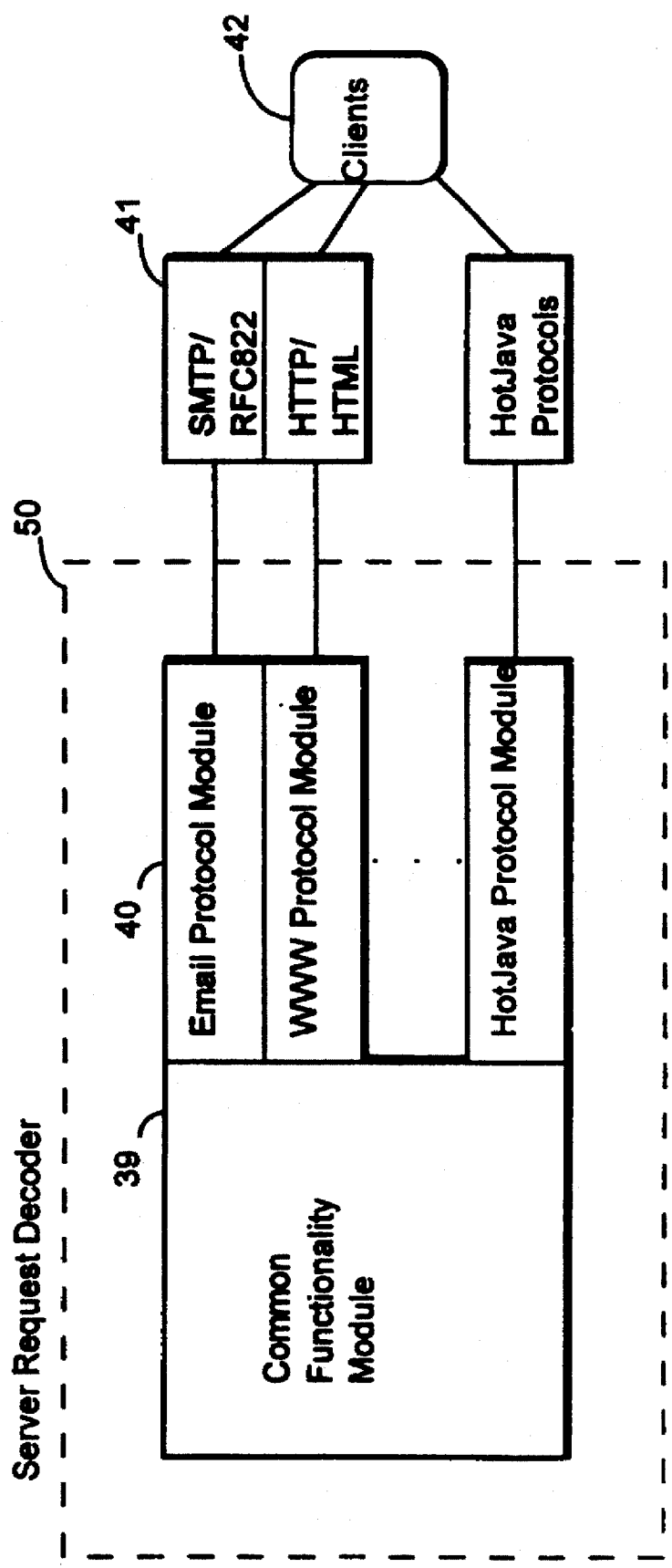
FIG. 5 is a diagram of a preferred request decoder architecture.

FIG. 5 is a diagram of a preferred architecture for implementing the processing of the request decoder 11 described in FIG. 4. Based on the protocol 41 of the data object requester 42, corresponding modules 40 in a server request decoder 50 are used to process the request for the specific protocols. A common functionality module 39 in the server request decoder 50 performs additional processing which is not unique to any particular protocol.

Data Processing and Text Processing Language (TPL)

Data processing is handled by an interpreter for a specialized data processing language called text processing language (TPL). Data processing is the execution of a TPL program that expresses a particular abstract object. TPL is a prefix-operator language that works on strings of text and is based upon a combination of Scheme, a dialect of LISP and Tcl, a text-based scripting language. TPL is not the only possible choice for a data processing language. The reason for the choice of TPL is that it can be interpreted and can very easily manipulate text-based DFL's such as HTML and the POSTSCRIPT language. The DPL does not necessarily have to be interpreted; abstract DPL objects could be passed around in a compiled format. Nor does the DPL have to be a specialized language that operates on text-based DFL's. The DPL could also be a general purpose programming language like LISP, the SMALLTALK language, or C++ as long as the language can easily manipulate some sort of DFL.

Figure 6:
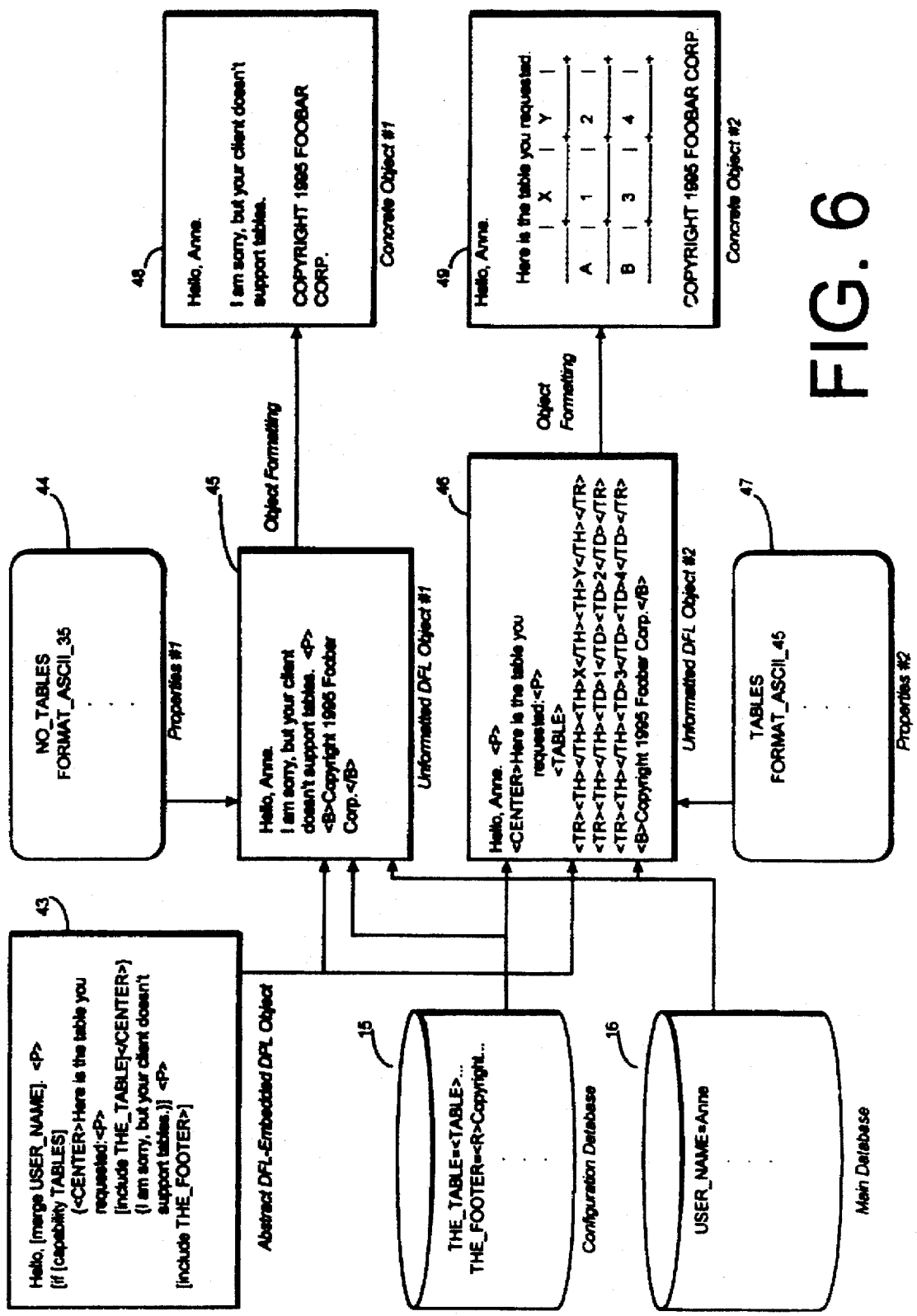
FIG. 6 is a diagram showing examples of two ways of processing and formatting an abstract DFL-embedded DPL object.

FIG. 6 is a diagram showing examples of two ways of processing and formatting an abstract DFL-embedded DPL object. The functionality of both the data processor 12 and object formatter 13 is illustrated in FIG. 6. The data processor 12 receives an abstract DFL-embedded DPL object 43. The data processor then processes codes in the object 43 using configurations from the configuration database 15 in order to perform data merging using data from the main database 16. For example, if the object 43 cannot accommodate tables according to properties 44, the data processor 12 produces a unformatted DFL object 45 which contains a corresponding message regarding the property (e.g. "I am sorry, but your client doesn't support tables"). On the other hand, if the object 43 supports tables according to properties 47, the data processor 12 produces a unformatted DFL object 46 which contains the data for the requested table along with the corresponding codes. Accordingly, based on properties of the request, as determined by the request decoder 11, the data processor 12 performs the merging of data or other processing if the properties do not support the data to be merged. The actual data and codes shown in FIG. 6 are for illustration purposes only and are simply one example of data merging according to the principles of the present invention.

FIG. 2C provides an example of unformatted DFL object 3 resulting from processing of the object 2 by the data processor 12. Object 2 contains the actual merged data for the table, along with various formatting codes. For example, the HTML tags "<B>" and "</B>" indicate that the information between these tags is to be shown in bold.

Data Formatting and Extended HTML (XHTML)

Data formatting in the object formatter 12 (see FIG. 1) is handled by a set of filters that convert internal DFL objects into concrete data objects ready for transport through one of the communication protocol modules. The formatting rules used by the filters are stored in the configuration database. The present choice for a DFL is a custom, extended version of HTML called XHTML. Objects are converted from XHTML to plain HTML for the World Wide Web and to various ASCII formats for RFC822 mail. Plain HTML and RFC822 ASCII are not the only types of formats that can be converted to from XHTML, but are so chosen because electronic mail and the World Wide Web are the currently available protocol modules. Filters can fairly easily be written for other formats as well, such as MIME. Again, just as with the DPL, XHTML is not the only possible choice for a DFL. XHTML was chosen because it is a text-based markup language and works well with TPL. There is no requirement that a DFL be text-based, either. However, it should be in some format that is easily manipulated by an accompanying DPL.

FIG. 6 illustrates formatting an abstract DFL-embedded DPL object by the object formatter 13 in the example provided above. If the client does not support tables in the example, the object formatter 13 produces concrete object 48 with the corresponding message. On the other hand, if the client supports tables, the object formatter 13 produces concrete object 49 with the merged data in the requested table. Accordingly, using properties of the data object requester (client) as determined by the request decoder 11, the object formatter uses rules from the configuration database in order to process the formatting codes in the unformatted DFL object in order to produce a concrete object.

FIG. 2D provides an example of concrete object 4 resulting from processing of the object 3 by the object formatter 13. Object 4 contains the formatted table, assuming that the client supports tables.

Object Delivery

The object deliverer 14 uses the same protocol modules as the request decoder 11 to transport formatted objects back to the appropriate client and user. The deliverer performs final assembling and formatting of data in order to transmit the object. Alternatively, the object formatter 13 could be configured to also perform the functions of the object deliverer 14. Again, for the object deliverer 14, protocol modules do not have to be limited to SMTP and HTTP. Before sending out an object, appropriate "glue data" is added to turn the object into a valid message for the protocol. For example, for SMTP mail, standard RFC822 headers (such as "To," "From," "Subject," etc.) are prepended as shown in Table 1. For HTTP, a standard MIME header is prepended to the HTML document. Configurations for this final preparation of objects before transmission are be stored in the configuration database 15.

TABLE 1

| | |
|---|---|
| Constant: | (FIELDS-SEND) ( |
| | X-ECI-INFO, |
| | RETURN-PATH, |
| | RECEIVED, |
| | DATE, |
| | FROM, |
| | SUBJECT, |
| | SENDER, |
| | REPLY-TO, |
| | ERRORS-TO, |
| | RETURN-RECEIPT-TO, |
| | TO, CC, BCC, |
| | COMMENT, |
| | COMMENT-TYPE, |
| | CONTENT-LENGTH |
| | ); |

FIG. 2E provides an example of an outgoing object 5 resulting from processing of the object 4 by the object deliverer 14. Object 5 contains the "from" and "to" information for transmission.

For certain protocols, it is possible that a recipient of a data object is different than the requester. It is also possible that the protocol used in a response to a request is different from the protocol used in the request itself. For example, one client may send a request via the World Wide Web asking that a particular email message be forwarded to another known client/user. Usually, however, some sort of acknowledgment is additionally provided to the requester via the same protocol as the request. In the case where the recipient or response protocol are different than the requester or request protocol, it is not usually immediately discernable what properties or capabilities the recipient will have. Therefore, these properties of the recipient are typically either recalled from memory (in the main database 16), or assumptions are made about them based upon rules and heuristics in the configuration database 15.

Main Database Module

A preferred embodiment of the invention uses a relational database management system (RDBMS) for the main database 16. This, again, is not essential. The main database 16 could be stored in some other type of database, such as an object database management system (ODMBS), in a set of files in some sort of filesystem, or a combination thereof. No particular structure is essential. The only requirements are that the main database module 16 provide a means to store the desired data for and about clients and users and that the other modules (the request decoder 11, data processor 12, data formatter 13, and object deliverer 14) are able to access it in appropriate ways.

Configuration Database Module

A preferred embodiment of the invention uses fast, read-only lookup tables encoded in data structures in the Perl language as its configuration database 15. These lookup tables are generated by a compiler for a configuration definition language (CDL) called resource description language (RDL). Using lookup tables is not the only way to encode the configurations. For example, rule sets may be compiled (either by hand or automatically) into programming language code (such as Perl, C, or assembly language) for efficiency or other reasons. Appendix A provides an example of segments of RDL showing property and routing configurations for email (electronic mail) and World Wide Web requests. Appendix B provides an example of segments of RDL showing formatting configurations for email and World Wide Web requests. Appendix C provides an example of segments of Perl which apply compiled property and capability rules to analyze requests.

It is neither essential that the configuration database 15 be implemented in Perl data structures (or any other programming language) nor that these configurations be compiled from RDL or any configuration description language. It is possible to store the configurations in separate files or even in a conventional database system (such as an RDBMS or ODBMS). How the configuration database 15 is stored is not as important as what is stored and how efficiently items are accessed. What is essential about the configuration database 15 is that it effectively stores the necessary configurations. These necessary configurations typically include, as described above, rule sets for properties of requests and clients, abstract data objects meant for serving, formatting rules, delivery preparation rules, and any other configurations for which it is desirable to have central storage and control.

The invention may be embodied in other specific forms without departing from the spirit or essential characteristics thereof. The present embodiments are therefore to be considered in all respects as illustrative and not restrictive, the scope of the invention being indicated be the appended claims rather than by the foregoing description, and all changes which come within the meaning and range of equivalency of the claims are therefore intended to be embraced therein.

APPENDIX A

The following segment of RDL shows property and routing configurations for email (electronic mail) requests:

```
/*  ********************************************************
    PROPERTY DEFINITIONS
    ******************************************************** */
Property: (TO-HELP)         MATCHES-USER-CI
                            (TO, "^\w*help(\\.|$)");
Property: (TO-HELP-EMAIL)   MATCHES-USER-CI (TO, "email");
Property: (TO-HELP-BROWSE)  MATCHES-USER-CI (TO, "brows");
Property: (CONTAINS-FORM)   MATCHES
            (.BODY,
            "■=----=[\\000-\\377]*ECI-FID:[\\000-\\377]*=----==-");
/*  ********************************************************
    ROUTING RULES
    ******************************************************** */
Route: CMP-HELPSERV-EMAIL    (TO-HELP, TO-HELP-EMAIL);
Route: CMP-HELPSERV-BROWSE   (TO-HELP, TO-HELP-BROWSE);
Route: CMP-HELPSERV-INDEX    (TO-HELP);
Route: CMP-FORMSERV          (CONTAINS-FORM);
```

The following segment of RDL shows property and routing configurations for World Wide Web requests:

```
/*  ********************************************************
    PROPERTY DEFINITIONS
    ******************************************************** */
Property: (HAS-FORM)    MATCHES-CI
                        (.REQUEST_METHOD, "POST");
Property: (WELCOME)     MATCHES-CI
                        (.QUERY_STRING, "^WELCOME");
```

-continued

```
Property: (DEFAULT)     TRUE;
/*  ********************************************************
    ROUTING RULES
    ******************************************************** */
Route: COMPONENT FORMS        (HAS-FORM);
Route: COMPONENT-COMSERV      (WELCOME);
Route: COMPONENT-UNKNOWN      (DEFAULT);
```

APPENDIX B

The following segment of RDL shows formatting configurations for email requests.

```
/*  ********************************************************
    REQUEST PROPERTIES
    ******************************************************** */
Property: (FROM-AOL)         MATCHES-DOMAIN-CI
                             (FROM, "^aol.com$");
Property: (FROM-COMPUSERVE)  MATCHES-DOMAIN-CI
                             (FROM, "^compuserve.com$");
Property: (FROM-PRODIGY)     MATCHES-DOMAIN-CI
                             (FROM, "^prodigy.com$");
/*  ********************************************************
    FORMATTING RULES
    ******************************************************** */
Format-Rule: FMT-AOL         (FROM-AOL);
Format-Rule: FMT-COMPUSERVE  (FROM-COMPUSERVE);
Format-Rule: FMT-PRODIGY     (FROM-PRODIGY);
Format-Rule: FMT-ASCII       (DEFAULT);
/*  ********************************************************
    FORMAT DEFINITIONS
    ******************************************************** */
Format: (FMT-ASCII)          ("format_ascii", 75, 5);
Format: (FMT-AOL)            ("format_ascii", 45, 4);
Format: (FMT-COMPUSERVE)     ("format_ascii", 75, 5);
Format: (FMT-PRODIGY)        ("format_ascii", 55, 5);
```

The following segment of RDL shows formatting configurations for World Wide Web requests.

```
/*  ********************************************************
    PROPERTY DEFINITIONS
    ******************************************************** */
Property: (LYNX)         MATCHES-CI (.HTTP_USER_AGENT,
                         "Lynx/");
Property: (MOSAIC)       MATCHES-CI (.HTTP_USER_AGENT,
                         "NCSA Mosaic");
Property: (MOSAIC-2.5)   MATCHES-CI (.HTTP_USER_AGENT,
                         "NCSA Mosaic.*/2\\.5");
Property: (NETSCAPE)     MATCHES-CI (.HTTP_USER_AGENT,
                         "Mozilla/");
Property: (NETSCAPE-1.1) MATCHES-CI (.HTTP_USER_AGENT,
                         "Mozilla/1\\.1");
/*  ********************************************************
    CAPABILITY RULES
    ******************************************************** */
Capability-Rule: INLINE-IMGS     (MOSAIC);
Capability-Rule: TABLES          (MOSAIC-2.5);
Capability-Rule: INLINE-IMGS     (NETSCAPE);
Capability-Rule: EXT-IMG-ALIGN   (NETSCAPE);
Capability-Rule: TABLES          (NETSCAPE-1.1);
```

APPENDIX C

The following segment of Perl shows an example of a compiled application of property rules.

```
sub find_properties
{
    local (*fields) = @_;
```

-continued

```
local (@properties);
if ($fields {".HTTP_USER_AGENT"} =~/LynxV/oi)
{
    push (@properties, "LYNX");
}
if ($fields {".HTTP_USER_AGENT"} =~/NCSA Mosaic/oi)
{
    push (@properties, "MOSAIC");
}
if ($fields {".HTTP_USER_AGENT"} =~/NCSA Mosaic.*V2\.5/oi)
{
    push (@properties, "MOSAIC-2.5");
}
if ($fields {".HTTP_USER_AGENT"} =~/MozillaV/oi)
{
    push (@properties, "NETSCAPE");
}
if ($fields {".HTTP_USER_AGENT"} =~/MozillaV1\.1/oi)
{
    push (@properties, "NETSCAPE-1.1");
}
return @properties;
}
```

The following segment of Perl shows an example of a compiled application of capability rules.

```
sub find_capabilities
{
    local (@properties) = @_;
    local (@capabilities);
    if (grep ($_eq "MOSAIC", @properties))
    {
        push (@capabilities, "INLINE-IMGS");
    }
    if (grep ($_eq "MOSAIC-2.5", @properties))
    {
        push (@capabilities, "TABLES");
    }
    if (grep ($_eq "NETSCAPE", @properties))
    {
        push (@capabilities, "INLINE-IMGS", "EXT-IMG-ALIGN");
    }
    if (grep ($_eq "NETSCAPE-1.1", @properties))
    {
        push (@capabilities, "TABLES");
    }
    return @capabilities;
}
```

What is claimed is:

1. An integrated request-response system, comprising:
   (a) decoding means for decoding a received request object to determine which of a plurality of communication protocols was used to transmit the request object;
   (b) parsing means for parsing at least one request from the request object based on the determined communication protocol;
   (c) selecting means for selecting a message template from a plurality of message templates based on a type of the at least one parsed request; and
   (d) merging means, operatively coupled to the selecting means, for merging data selected as a function of the at least one parsed request with the message template to generate a protocol-independent response.

2. The integrated request-response system of claim 1, wherein the decoding means comprises means for determining properties of an entity selected from a group consisting of: a requester client and an intended recipient of an automated response message.

3. The integrated request-response system of claim 1, further comprising means for determining properties of a user client, the user client properties being selected from a group consisting of: geographic location, gender, age interests, and other demographic information.

4. The integrated request-response system of claim 1, wherein the decoding means further comprises means for determining if the communication protocol used to transmit the request object is selected from a group consisting of: a PRODIGY MAIL protocol and an AMERICA ONLINE Mail protocol.

5. The integrated request-response system of claim 1, further comprising receiving means, operatively coupled to the decoding means, for receiving the request object according to one of the plurality of communication protocols, the one protocol being selected from a group consisting of: Simple Mail Transfer Protocol (SMTP), Hypertext Transfer Protocol (HTTP), Request For Comments 822 (RFC822), and Hypertext Markup Language (HTML).

6. For Use in an integrated request-response system, a response system for generating responses to various types of requests received according to various communication protocols, the response system comprising:
   (a) selecting means for selecting a message template from a plurality of message templates based on a type of a request within a request object received by the integrated request-response system in response to determining from the request object which of the various communication protocols was used to transmit the request object;
   (b) merging means, operatively coupled to the selecting means, for merging data selected as a function of the request with the message template to generate a protocol-independent response; and
   (c) formatting means, operatively coupled to the merging means, for formatting an automated response message in a format compatible with a client as a function of the determined communication protocol and the protocol-independent response.

7. The response system of claim 6, further comprising decoding means, operatively coupled to the selecting means, for decoding the request object to determine properties of the client, the client being selected from a group consisting of: a requester client and an intended recipient of the automated response message.

8. The response system of claim 6, wherein the properties are selected from a group consisting of: geographic location, gender, age, interests, and other demographic information.

9. The response system of claim 6, wherein the decoding means comprises means for identifying which of the various communication protocols was used to transmit the request object.

10. The response system of claim 9, wherein the decoding means further comprises means for determining if the communication protocol used to transmit the request object is selected from a group consisting of: a Prodigy Mail protocol and an America Online Mail protocol.

11. The response system of claim 6, wherein the merging means further comprises means for inserting data at particular locations within the message template.

12. The response system of claim 6, wherein the merging means further comprises means for performing predetermined functions in order to generate the data being merged with the message template.

13. The response system of claim 12, wherein the merging means further comprises means for specifying the predetermined functions using codes embedded within the message template.

14. The response system of claim 6, further comprising:
   (a) means for retrieving rules that correlate properties of the client to the various communication protocols; and (b) means for applying the retrieved rules to the request object in order to determine the properties of the client.

15. The response system of claim 6, further comprising transmitting means, operatively coupled to the formatting means, for transmitting the automated response message to an intended recipient of the automated response message according to one of the various communication protocols, the one protocol being selected from a group consisting of: Simple Mail Transfer Protocol (SMTP), Hypertext Transfer Protocol (HTTP), Request For Comments 822 (RFC822), and Hypertext Markup Language (HTML).

16. An integrated request-response method, comprising:
   (a) decoding a received request object to determine which of a plurality of communication protocols was used to transmit the request object;
   (b) parsing at least one request from the request object based on the determined communication protocol;
   (c) selecting a message template from a plurality of message templates based on a type of the at least one parsed request; and
   (d) merging data selected as a function of the at least one parsed request with the message template to generate a protocol-independent response.

17. The integrated request-response method of claim 16, wherein decoding the received request object comprises decoding properties of an entity selected from a group consisting of: a requester client and an intended recipient of the automated response message.

18. The integrated request-response method of claim 16, further comprising determining properties of a user client, the user client properties being selected from a group consisting of: geographic location, gender, age, interests, and other demographic information.

19. The integrated request-response method of claim 16, wherein decoding the received request object comprises determining if the communication protocol used to transmit the request object is selected from a group consisting of: a PRODIGY Mail protocol and an AMERICA ONLINE Mail protocol.

20. The integrated request-response method of claim 16, further comprising receiving the request object according to one of the plurality of communication protocols, the one protocol being selected from a group consisting of: Simple Mail Transfer Protocol (SMTP), Hypertext Transfer Protocol (HTTP), Request For comments 822 (RFC822), and Hypertext Markup Language (HTML).

21. For use in an integrated request-response method, a response method for generating responses to various types of requests received according to various communication protocols, the response method comprising:
   (a) selecting a message template from a plurality of message templates based on a type of a request within a request object in response to determining from the request object which of the various communication protocols was used to transmit the request object;
   (b) merging data with the message template to generate a protocol-independent response; and
   (c) formatting an automated response message in a format compatible with a client as a function of the determined communication protocol and the protocol-independent response.

22. The response method of claim 21, further comprising decoding the request object to determine properties of the client, the client being selected from a group consisting of: a requester client and an intended recipient of the automated response message.

23. The response method of claim 21, wherein the properties are selected from a group consisting of: geographic location, gender, age, interests, and other demographic information.

24. The response method of claim 21, wherein decoding the request object comprises identifying which of the various communication protocols was used to transmit the request object.

25. The response method of claim 24, wherein decoding the request object comprises determining if the communication protocol used to transmit the request object is selected from a group consisting of: a PRODIGY Mail protocol and an AMERICA ONLINE Mail protocol.

26. The response method of claim 21, wherein merging data with the message template comprises inserting the data at particular locations within the message template.

27. The response method of claim 21, wherein merging data with the message template comprises performing predetermined functions to generate the data being merged with the message template.

28. The response method of claim 27, wherein merging data with the message template further comprises specifying the predetermined functions using codes embedded within the message template.

29. The response method of claim 21, further comprising:
   (a) retrieving rules that correlate properties of the client to the various communication protocols; and
   applying the retrieved rules to the request object in order to determine the properties of the client.

30. The response method of claim 21, further comprising transmitting the automated response message to an intended recipient of the automated response message according to one of the various communication protocols, the one protocol being selected from a group consisting of: Simple Mail Transfer Protocol (SMTP), Hypertext Transfer Protocol (HTTP), Request For Comments 822 (RFC822), and Hypertext Markup Language (HTML).

31. An integrated request-response system, comprising:
   (a) receiving means for receiving a request object according to any one of a plurality of communication protocols;
   (b) decoding means, operatively coupled to the receiving means, for decoding the request object to determine which of the plurality of communication protocols was used to transmit the request object;
   (c) parsing means for parsing at least one request from the request object based on the determined communication protocol;
   (d) selecting means, operatively coupled to the decoding means, for selecting a message template from a plurality of message templates based on a type of the at least one parsed request;
   (e) merging means, operatively coupled to the selecting means, for merging data selected as a function of the at least parsed request with the message template to generate a protocol-independent response;
   (f) formatting means, operatively coupled to the decoding means and the merging means, for formatting an automated response message in a format compatible with a client as a function of the determined communication protocol and the protocol-independent response; and
   (g) transmitting means, operatively coupled to the formatting means, for transmitting the automated response message to an intended recipient of the automated response message according to a particular protocol of the plurality of communication protocols.

* * * * *